United States Patent [19]

Yates et al.

[11] 4,310,659

[45] Jan. 12, 1982

[54] TWO-STAGE HYDROLYSIS PROCESS FOR THE PREPARATION OF NYLON 6

[75] Inventors: Samuel L. Yates; Charles J. Cole; Albert H. Wiesner, all of Columbia, S.C.; John W. Wagner, Petersburg, Va.

[73] Assignee: Allied Corporation, Morris Township, Morris County, N.J.

[21] Appl. No.: 141,827

[22] Filed: Apr. 21, 1980

[51] Int. Cl.$^3$ ............................................. C08G 69/16
[52] U.S. Cl. ..................................... 528/323; 526/65; 526/67; 526/68; 526/71
[58] Field of Search ................... 528/323; 526/65, 67, 526/68, 71

[56] References Cited

U.S. PATENT DOCUMENTS

| | | | |
|---|---|---|---|
| 2,562,796 | 7/1951 | Koch | 528/323 |
| 3,090,773 | 5/1963 | Papero et al. | 528/323 |
| 3,171,829 | 3/1965 | Wiesner et al. | 528/323 |
| 3,287,322 | 11/1966 | Zimmer et al. | 528/323 |
| 3,548,482 | 7/1969 | Goto et al. | 528/323 |
| 3,558,567 | 1/1971 | Twilley et al. | 528/323 |
| 3,578,640 | 5/1971 | Twilley et al. | 528/323 |
| 3,813,366 | 5/1974 | Wright et al. | 528/323 |
| 4,049,638 | 9/1977 | Doerful et al. | 528/323 |

FOREIGN PATENT DOCUMENTS 1097347 1/1968 United Kingdom .

*Primary Examiner*—Harold D. Anderson
*Attorney, Agent, or Firm*—Richard A. Anderson

[57] ABSTRACT

A two-stage hydrolysis process for polymerizing epsilon-caprolactam is disclosed comprising a first stage from a temperature of about 180° C.–260° C., a pressure of 20 to 150 psig, for a period of about 0.5 to 4 hours, then before equilibrium conditions are reached a second stage at a temperature of about 200° C.–260° C., a pressure of about 100–900 Torr for a period of about 2 to 15 hours, while continuously removing most of the water so that water is removed both during hydrolyzation and during the subsequent polycondensation, whereby the cyclic dimer content of the shaped polymer article is below 0.2 percent by weight.

10 Claims, 3 Drawing Figures

TWO STAGE HYDROLYSIS PROCESS

TWO-STAGE HYDROLYSIS PROCESS FOR THE PREPARATION OF NYLON 6

BACKGROUND OF THE INVENTION

This invention relates to the production of polyamides, particularly the production of nylon 6 shaped articles such as filaments produced directly from freshly prepared (nascent) polymer. More particularly, the invention relates to an improvement in the first or hydrolysis step of polymerization of nylon, namely, using a two-stage hydrolysis with different conditions in each stage.

Previous nascent, or polymerization directly coupled to spinning, processes, such as that described in U.S. Pat. No. 3,813,366, hereby incorporated by reference, and in U.S. Pat. No. 3,578,640 also hereby incorporated by reference, produce shaped articles such as filaments (fiber) having higher water extractables content than the similar articles (fiber) produced from polymer chips which were water washed and dried before being melted and shaped as by spinning. A particularly troublesome water extractable component to processors of shaped articles (fiber) are cyclic oligomers of caprolactam. Present directly coupled (nascent) processes produce fiber or other shaped articles having a cyclic dimer content of about 0.5 to 0.7 percent compared to fiber or shaped articles produced from washed, dried, and melted chips of about 0.1 percent cyclic dimer content.

During the initial ring opening of the caprolactam in the hydrolysis process, the opened ring is free to combine with other open rings thereby forming linear and cyclic oligomers. The cyclic dimer of caprolactam thus formed is very stable and has a low vapor pressure so is not removable from the coupled process. The presence of the cyclic dimer in the finished yarn product causes processing difficulties in the customer mill. The mill problems are associated with the cyclic dimer migrating to the surface of the yarn and depositing on the various yarn path components resulting in a situation where the mill process must be shut down to clean the surface as a result of poor yarn quality caused by improper surface frictional qualities which was, in turn, caused by the cyclic dimer buildup. This condition has been called "yarn shedding" and causes the customer downtime on machinery and a reduction of quality of product. Several methods are known to reduce the effect of the cyclic dimer, such as washing the yarn with water and then drying it, or applying a special overfinish to the yarn to enhance the frictional qualities and allow it to be processed. Both of these methods are expensive and, therefore, unattractive to the customer. Therefore, the only practical solution is to reduce the amount of cyclic dimer formed in the coupled polymerization process to a level low enough that its presence is not a factor in yarn quality. See also U.S. Pat. No. 3,287,322, hereby incorporated by reference, for a discussion of oligomers and their effects in yarn.

By water extractables is meant herein the components of the polycaprolactam shaped polymer article (fiber) which can be extracted with water by washing at a temperature of 100° C. for a period of thirty minutes. The components of water extraction are generally caprolactam, linear oligomers and cyclic oligomers of caprolactam.

By oligomer is meant herein a caprolactam compound having 2 to 4 repeating molecular units.

By polymer is meant herein a polycaprolactam having five or more repeating molecular units.

SUMMARY OF THE INVENTION

The previously known process for production of polycaproamide shaped articles from molten anhydrous nascent polymers was (a) continuously hydrolyzing epsilon-caprolactam to form a prepolymer, then (b) continuously removing most of the water extractables and (c) completing the polymerization reaction by polycondensation, then (d) continuously extruding said polymer melt and finally (e) cooling said extruded polymer to form uniformly shaped articles. The improvement of this invention comprises carrying out the continuous hydrolyzation step (a) in two stages, the first stage at a temperature of about 180° C., to 260° C., preferably about 200° C. to 230° C. at a pressure of about 20 to 150 psig., preferably 50 to 80 psig. for a period of about 0.5 to 4 hours, preferably for about 1.5 to 3 hours, then before an equilibrium caprolactam conversion condition is reached, a second stage at a temperature of about 200° C., to 260° C., preferably about 210° C. to 240° C., a pressure of about 100 to 900 Torr, preferably about 400 to 600 Torr, for a period of about 2 to 15 hours, preferably 6 to 10 hours, while continuously removing most of the water and some water extractables, so that water and water extractables are removed both during hydrolysis and during polycondensation, whereby the cyclic dimer content of the shaped polymer article is below 0.2 percent by weight.

Another embodiment of this invention comprises the above two-stage hydrolyzation process wherein the water extractables comprise caprolactam and oligomers of caprolactam and the caprolactam is separated from water and returned to the second stage.

The process of this invention provides effluent of the first stage comprising about 10 to 80 percent polymer, preferably about 30 to 50 percent polymer, about 20 to 90 percent, preferably about 50 to 70 percent caprolactam and about 0.7 percent water, and the effluent from the second stage comprises about 60 to 90 percent polymer and about 10 to 40 percent caprolactam.

In more detail, the previously known process for producing polycaproamide shaped articles from molten anhydrous nascent polymer was (a) continuously polymerizing epsilon-caprolactam at an elevated pressure and temperature in the presence of small amounts of water and optionally a terminating agent in the hydrolyzer reactor to form a prepolymer melt, then (b) continuously removing most of the water and part of the unreacted lactam from the prepolymer melt by exposure to vacuum in a vessel providing the prepolymer melt with large surface area-to-volume ratio, then (c) continuously transferring the melt to a surface renewal device also having large surface area-to-volume ratio, which promotes completion of the polymerization reaction by polycondensation and which removes residual amounts of vaporizable materials, at a temperature between about 225° C. and about 300° C., and a residence time of more than one hour, then (d) continuously extruding the melt, and finally (e) cooling the extruded polymer to form uniformly shaped articles. The improvement of this invention comprises carrying out step (a) as described in the second sentence of the Summary of the Invention above. The process of step (b) has a residence time of about 2 to about 20 minutes. The second stage of the two-stage hydrolysis process of this invention can be carried out in a vertical multistage hydrolyzer reactor with baffles between each stage to achieve a plug flow effect along the reactor. Also, the first stage of the two-stage hydrolysis of step (a) can be carried out in an agitated vessel. The prepolymer formed at step (a) by the process of this invention has a molecular weight of between about 2,000 to 14,000, preferably 7,000 to 9,000.

The conversion of caprolactam to prepolymer is an autocatalytic reaction in which there are actually two main reactions taking place. These reactions are hydrolysis where water reacts with caprolactam to form a linear oligomer, and addition where linear oligomers react with caprolactam to form higher molecular weight linear species (including polymer). When a feed of caprolactam and water is heated to reaction temperatures, the initial rate of conversion is slow due to only the hydrolysis reaction taking place. This period of slow initial conversion is sometimes referred to as the induction period. However, as the concentration of linear oligomers increases due to the hydrolysis reaction, the addition reaction begins to occur and the total rate of conversion increases. The conversion rate will reach a maximum about 25–45 percent conversion, after which the conversion rate will diminish as the caprolactam is depleted. Typical conversion curves are shown in FIG. 1. Conversion percent at maximum total ends is shown by the "X". To carry out this type of nonequilibrium condition reaction(s) in a continuous reactor system at a rate near the maximum (and to obtain high yield), the preferred system would consist of a stirred-tank reactor followed by a plug flow reactor. This is because, with efficient mixing, the feed entering the stirred-tank reactor would immediately assume the same composition as the mixture in the tank which can be adjusted by residence time to approach the maximum reaction rate (slope of conversion rate curve FIG. 1), never reaching equilibrium conditions. The plug flow reactor would then complete the conversion while sustaining the high rate as long as possible and maximizing the yield.

In the preferred process of this invention, the first reactor preferably will be a well mixed tank reactor to be operated at less than 50 percent conversion. The second reactor preferably will be a staged reactor to approximate a tubular or plug flow reactor.

FIG. 2 shows the relationship of percent conversion of lactam in the two-stage hydrolysis process of this invention to percent by weight of cyclic dimer in the yarn product. Cyclic dimer content of nylon 6 can be determined by the analysis of the following references:

1. D. Heikens, *Recueil,* 75, 1199 (1956).
2. S. Mori and T. Takeuchi, *Chrom.,* 49, 230 (1970).

Note that although less than 0.2 percent cyclic dimer can be achieved at 90 percent, or less, conversion with the two-stage process of this invention, to accomplish the preferred less than 0.1 percent cyclic dimer, conversion would be less than 75 percent. Economics, namely, the cost of removing and recycling unreacted monomer, dictates at least a 60 percent conversion rate for this two-stage hydrolysis process. Note that the first stage preferred conversion is less than 50 percent. The operating conditions are as follows:

|  | First Stage | Second Stage |
| --- | --- | --- |
| Temperature, °C. | 230 | 230 |
| Pressure | 60 psig. | As shown in Figure 2 |
| Residence Time, Hrs. | 2 | 6 to 11 |
| Flow | Agitated | Plug |

DESCRIPTION OF THE PREFERRED EMBODIMENT

Figure 1:
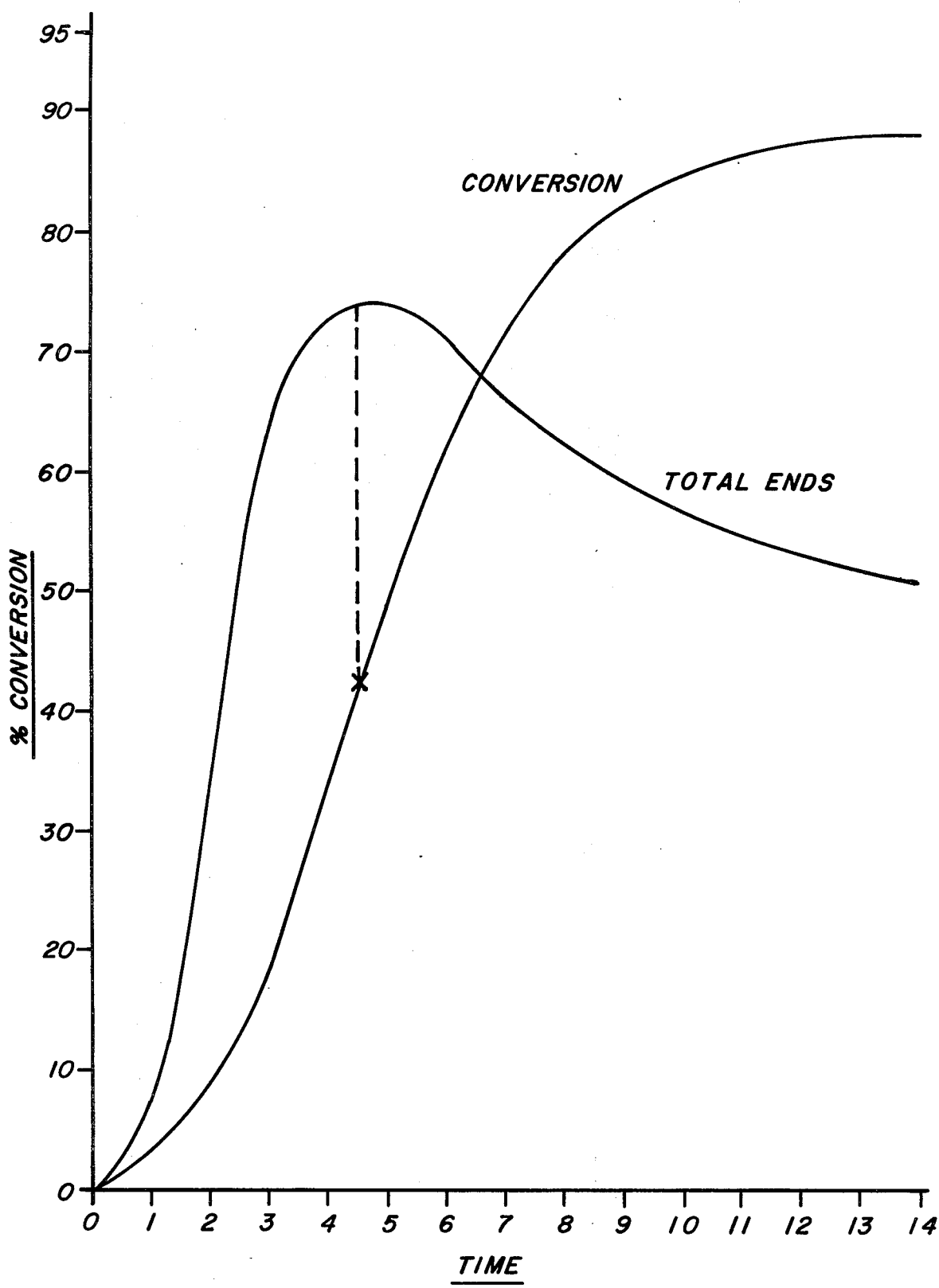
FIG. 1 is a graph showing the relationship of total ends and conversion rate, described above.
Figure 2:
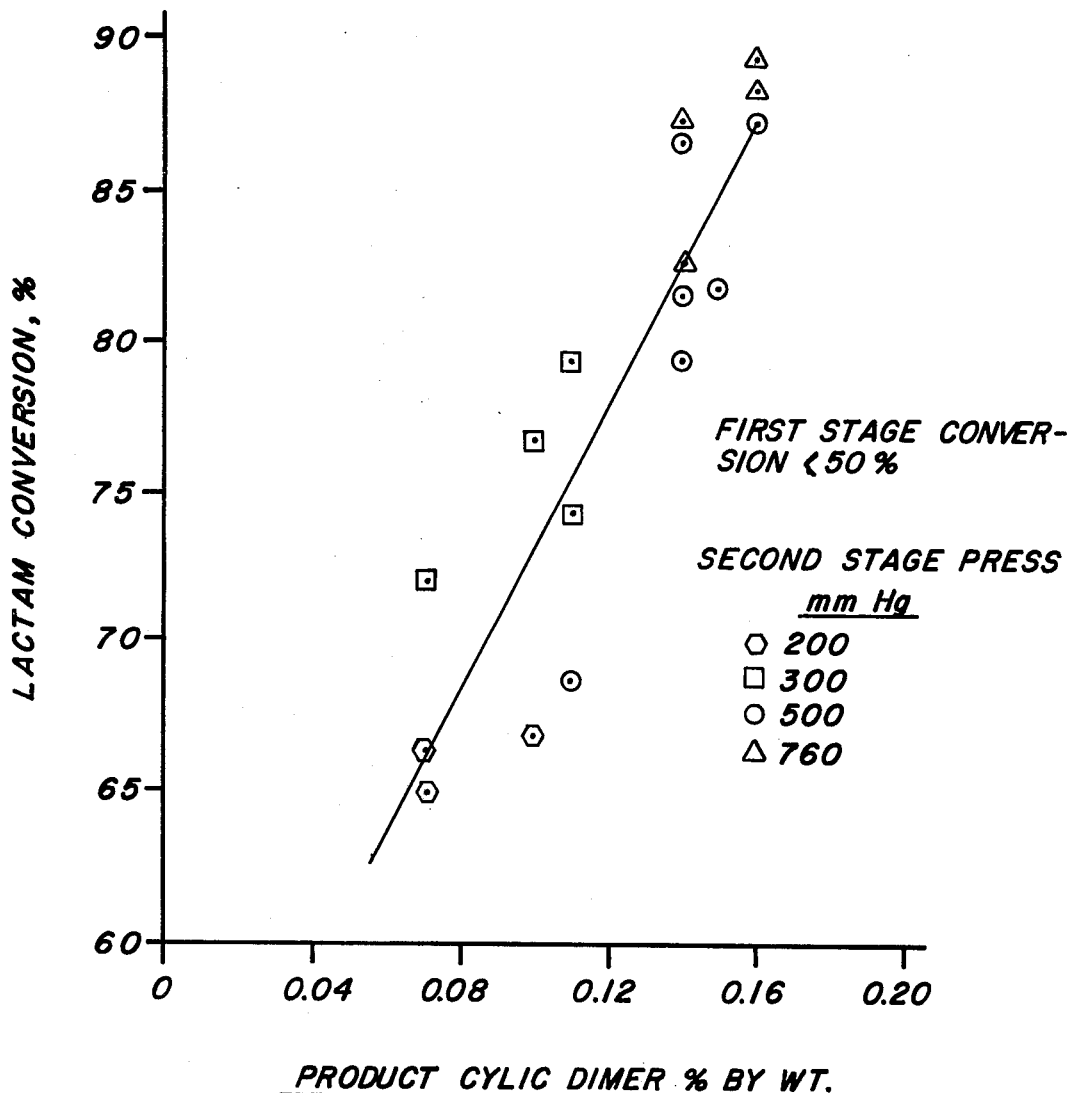
FIG. 2 is a graph showing the relationship of lactam conversion and amount of cyclic dimer in product yarn, described above.
Figure 3:
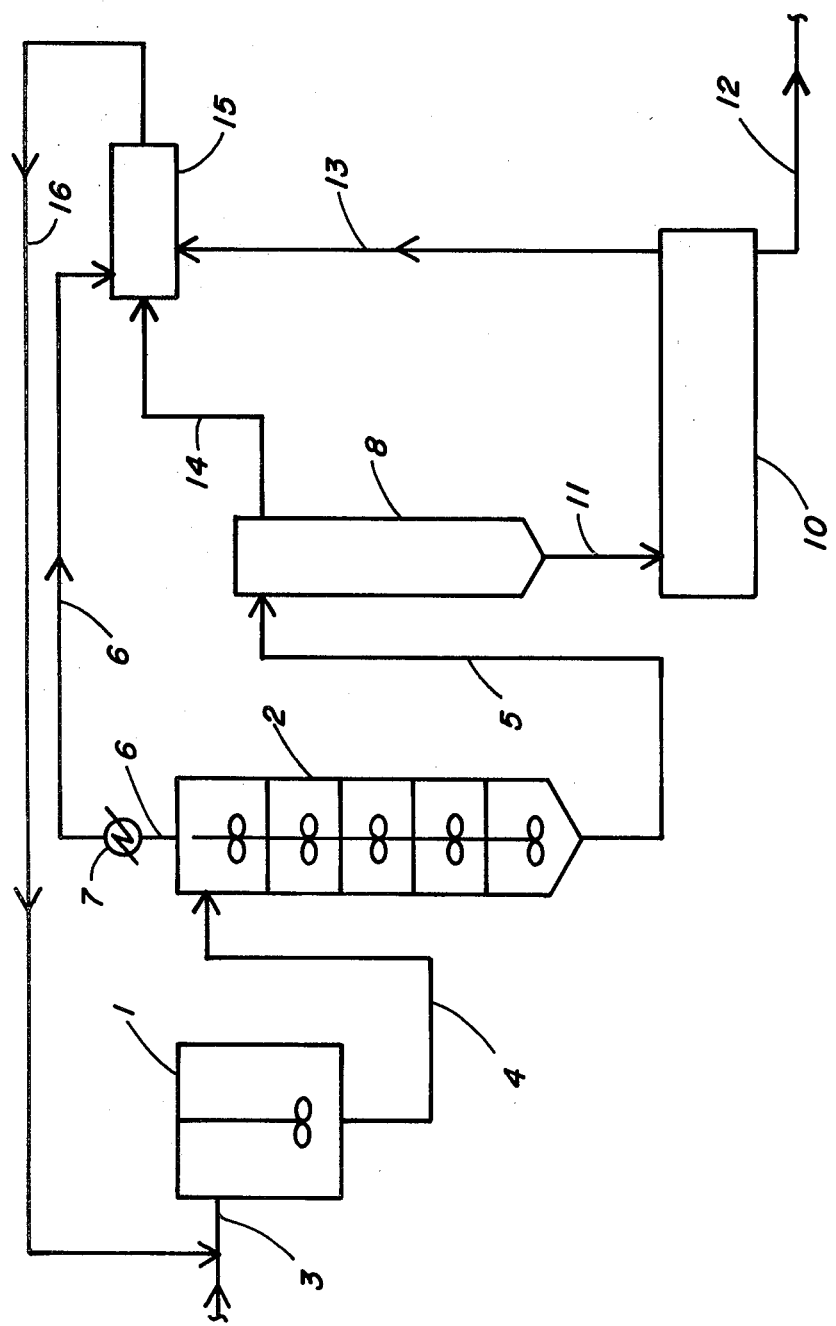
FIG. 3 is a schematic of the apparatus used in the process of this invention, described below.

FIG. 3 shows the two-stage hydrolysis of this invention. Caprolactam, water and additives are fed into a first-stage agitated vessel 1 through line 3. The first stage or initiation reaction takes place at a temperature of between about 180° C. to 260° C., preferably at between about 200° C. to 230° C., at a pressure of between about 20 to 150 psig., preferably of between about 50 to 80 psig., for a period of about 0.5 to 4 hours, preferably a period of about 1.5 to 3 hours.

Effluent from the first stage vessel 1 enters the second stage vertical, multistage, baffled, plug-flow vessel 2 through the line 4. This effluent comprises about 30 to 50 percent polymer, 50 to 70 percent caprolactam and about 0.7 percent water. This effluent undergoes polyaddition and some further hydrolysis in the second stage vessel 2 under a vacuum of from about 100 to 900 Torr, preferably from about 400 to 600 Torr and at a temperature of from about 200° C. to 260° C., preferably of from about 210° C. to 240° C., for a period of from about 2 to 15 hours, preferably from about 6 to 10 hours, while most of the water is withdrawn through vacuum line 6. Some caprolactam is vaporized and condensed by condenser 7 and returned to second stage vessel 2 by gravity flow through vacuum line 6. From second stage vessel 2, effluent flows through line 5. This effluent is a prepolymer comprising 60–90 percent polymer and 10–40 percent caprolactam. The polymer in this prepolymer is of significantly higher average molecular weight than the polymer in the effluent from the first stage.

FIG. 3 shows the two-stage hydrolysis of this invention in place, Items 1 to 7, directly coupled to a prior art direct spinning of molten polymer, polymerization process. The prepolymer and caprolactam then undergo further polymerization downstream in the vessels of the prior art, 8 and 10. Prepolymer from line 5 flows into evaporator vessel 8 which is a vessel providing a large surface area-to-volume ratio to facilitate removal under vacuum of the water remaining, some of the water extractables and most of the caprolactam. This vessel is under high vacuum of about 5–30 mm. Hg at a temperature of about 240° C.–260° C. Residence time in vessel 8 is short, less than one hour, preferably from about 2 to about 20 minutes. The volatiles described above are removed through vacuum line 14, into vacuum system 15. Molten polymer effluent flows through line 11 into finisher 10. Finisher 10 is a surface renewal device also having a large surface area-to-volume ratio and promotes completion of the polymerization reaction by polycondensation. Finisher 10 also removes residual amounts of volatiles through vacuum line 13 to vacuum system 15. Finisher 10 operates at a temperature of between about 225° C. and 300° C. and a residence time of more than one hour. Finished molten nylon 6 polymer then flows through line 12 to spinning without being solidified or further treatment. Caprolactam recovered in vacuum system 15 is recycled back to vessel 1 through line 16. Yarn from spinning is useful for face fiber in carpets, rugs, upholstery and the like.

We claim:

1. In a process for the production of polycaproamide shaped articles from molten anhydrous nascent polymer comprising continuously hydrolyzing epsilon-caprolactam to form a prepolymer, then continuously removing most of the water extractables and completing the polymerization reaction by polycondensation, then continuously extruding said polymer melt, and finally cooling said extruded polymer to form uniformly shaped articles, the improvement comprising carrying out the continuous hydrolyzation in two stages, a first stage at a temperature of about 180° C. to 260° C., a pressure of about 20 to 150 psig. for a period of about 0.5 to 4 hours, then before an equilibrium conversion condition is reached, a second stage at a temperature of about 200° C. to 260° C., a pressure of about 100 to 900 Torr for a period of about 2 to 15 hours, while continuously removing most of the water and some water extractables, so that water and water extractables are removed both during hydrolyzation and during polycondensation, whereby the cyclic dimer content of the shaped polymer article is below 0.2 percent by weight.

2. The process of claim 1 wherein said first stage temperature is between about 200° C. to 230° C., pressure is about 50–80 psig. and time is about 1.5 to 3 hours, said second stage temperature is about 210° C. to 240° C., pressure is about 400 to 600 Torr and time is about 6 to 10 hours and said water extractable comprises caprolactam and said caprolactam is separated from water and returned to said second stage.

3. The process of claim 1 wherein the effluent of the first stage comprises about 10 to 80 percent polymer, about 20 to 90 percent caprolactam and about 0.7 percent water, and the effluent from the second stage comprises about 60 to 90 percent polymer, and about 10 to 40 percent caprolactam.

4. The process of claim 3 wherein the effluent of the first stage contains about 30 to 50 percent polymer and 50–70 percent caprolactam.

5. In a process for the production of polycaproamide shaped articles from molten anhydrous nascent polymer comprising (a) continuously polymerizing epsilon-caprolactam at an elevated pressure and temperature in the presence of small amounts of water and a terminating agent in a hydrolyzer reactor to form a prepolymer melt, then (b) continuously removing most of the water and part of unreacted lactam from said prepolymer melt by exposure to vacuum in a vessel providing said prepolymer melt with large surface area-to-volume ratio, (c) continuously transferring said melt to a surface renewal device also having large surface area-to-volume ratio, which promotes completion of the polymerization reaction by polycondensation and which removes residual amounts of vaporizable materials, at a temperature of between about 225° C. and about 300° C., and a residence time of more than one hour, then (d) continuously extruding said melt, and finally (e) cooling said extruded polymer to form uniformly shaped articles, the improvement comprising carrying out step (a) in two stages, a first stage at a temperature of about 200° C. to 230° C., a pressure of about 50 to 80 psig. for a period of about 1.5 to 3 hours, then before an equilibrium conversion condition is reached a second stage at a temperature of about 210° C. to 240° C., a pressure of about 400 to 600 Torr for a period of about 6 to 10 hours, while continuously removing most of the water and some water extractables, so that water and water extractables are removed both during hydrolyzation and during polycondensation, whereby the cyclic dimer content of the shaped polymer article is below 0.2 percent by weight.

6. The process of claim 5 wherein step (b) has a residence time of about 2 to about 20 minutes.

7. The process of claim 5 wherein the second stage of the two stages of step (a) is carried out in vertical, multistage hydrolyzer reactor with baffles between each stage to achieve a plug flow effect along the length of the reactor.

8. The process of claim 7 wherein the first stage of step (a) is carried out in an agitated vessel.

9. The method of claim 1 or 5 wherein total conversion of epsilon-caprolactam to prepolymer in both stages is less than 90 percent.

10. The method of claim 9 wherein less than 50 percent conversion of epsilon-caprolactam to prepolymer takes place in the first stage.

* * * * *

UNITED STATES PATENT AND TRADEMARK OFFICE
CERTIFICATE OF CORRECTION

PATENT NO. : 4,310,659

DATED : January 12, 1982

INVENTOR(S) : Samuel L. Yates et al

It is certified that error appears in the above—identified patent and that said Letters Patent is hereby corrected as shown below:

On the title page, in the title, "preparation" should read -- polymerization --.

Signed and Sealed this

Eleventh Day of May 1982

[SEAL]

Attest:

GERALD J. MOSSINGHOFF

Attesting Officer     Commissioner of Patents and Trademarks